United States Patent
Fach et al.

(10) Patent No.: US 11,533,310 B2
(45) Date of Patent: Dec. 20, 2022

(54) AUTHENTICATION METHOD

(71) Applicant: Continental Teves AG & Co. OHG, Frankfurt am Main (DE)

(72) Inventors: Sebastian Fach, Schwalbach a. Ts. (DE); Gilles Yvars, Schwalbach a. Ts. (DE); Ahmad Sabouri, Schwalbach a. Ts. (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 35 days.

(21) Appl. No.: 17/168,455

(22) Filed: Feb. 5, 2021

(65) Prior Publication Data
US 2021/0250351 A1 Aug. 12, 2021

(30) Foreign Application Priority Data
Feb. 7, 2020 (EP) .................................... 20315016

(51) Int. Cl.
*H04L 9/40* (2022.01)
*B60R 25/24* (2013.01)

(52) U.S. Cl.
CPC .......... *H04L 63/0884* (2013.01); *B60R 25/24* (2013.01); *H04L 63/0442* (2013.01); *H04L 63/0869* (2013.01)

(58) Field of Classification Search
CPC ............... B60R 25/24; H04L 2463/061; H04L 63/0281; H04L 63/0435; H04L 63/0442; H04L 63/061; H04L 63/0869; H04L 63/0884; G06F 1/3209; G06F 1/3287; Y02D 10/00; Y02D 30/50
See application file for complete search history.

(56) References Cited

U.S. PATENT DOCUMENTS 6,073,236 A * 6/2000 Kusakabe ............. H04L 9/3273
709/227
7,457,953 B2 * 11/2008 First ........................ H04L 63/08
713/169

(Continued)

FOREIGN PATENT DOCUMENTS

| JP | H 03-282722 | 12/1991 |
| JP | H 10-20780 | 1/1998 |
| JP | 2015-003545 | 1/2015 |

OTHER PUBLICATIONS

Search Query Report from IP.com (performed Jul. 29, 2022) (Year: 2022).*

(Continued)

*Primary Examiner* — Sharon S Lynch
(74) *Attorney, Agent, or Firm* — Cozen O'Connor

(57) ABSTRACT

An authentication method and system for mutual authentication between a first entity and a third entity via a second entity, based on an authentication protocol used by the first entity and the third entity. The second entity forwards mutual authentication messages between the first entity and the third entity. An apparatus is configured to perform an authentication method for a mutual authentication between a first entity and a third entity via a second entity, based on an authentication protocol used by the first entity and the third entity, the second entity forwards mutual authentication messages between the first entity and the third entity.

11 Claims, 10 Drawing Sheets

(56) References Cited

U.S. PATENT DOCUMENTS

| | | | | |
|---|---|---|---|---|
| 8,107,397 | B1* | 1/2012 | Bagchi | H04L 9/0833 |
| | | | | 380/278 |
| 8,534,564 | B2* | 9/2013 | Hammad | G06Q 20/40 |
| | | | | 235/487 |
| 9,794,753 | B1* | 10/2017 | Stitt | G06F 21/31 |
| 9,913,989 | B2* | 3/2018 | Schilling | H04W 4/80 |
| 10,229,552 | B2* | 3/2019 | Holtappels | B60L 53/80 |
| 10,305,902 | B2* | 5/2019 | Kim | H04L 63/126 |
| 10,307,599 | B2* | 6/2019 | Schilling | G16H 40/67 |
| 2010/0034385 | A1* | 2/2010 | Gantman | H04L 9/065 |
| | | | | 708/250 |
| 2010/0161959 | A1* | 6/2010 | Sood | H04L 63/166 |
| | | | | 713/151 |
| 2011/0291803 | A1* | 12/2011 | Bajic | G08B 13/2462 |
| | | | | 340/10.1 |
| 2012/0031969 | A1* | 2/2012 | Hammad | G06Q 20/425 |
| | | | | 235/380 |
| 2012/0271380 | A1* | 10/2012 | Roberts | H04L 63/068 |
| | | | | 607/60 |
| 2015/0382085 | A1* | 12/2015 | Lawrie-Fussey | |
| | | | | G06K 19/0705 |
| | | | | 340/870.07 |
| 2016/0142409 | A1* | 5/2016 | Frei | G06F 21/33 |
| | | | | 713/176 |
| 2016/0232736 | A1* | 8/2016 | Holtappels | G07F 15/005 |
| 2017/0134943 | A1* | 5/2017 | Min | H04W 12/04 |
| 2017/0312530 | A1* | 11/2017 | Schilling | A61N 1/37252 |
| 2018/0028827 | A1* | 2/2018 | Schilling | A61N 1/37223 |
| 2018/0200525 | A1* | 7/2018 | Schilling | G16H 40/63 |
| 2019/0044943 | A1* | 2/2019 | Kim | H04L 9/08 |
| 2019/0135229 | A1* | 5/2019 | Ledvina | H04W 4/40 |
| 2019/0282819 | A1* | 9/2019 | Schilling | H04L 67/125 |
| 2020/0106877 | A1* | 4/2020 | Ledvina | H04M 1/72436 |
| 2020/0252436 | A1* | 8/2020 | Yoon | H04W 52/0229 |
| 2020/0389469 | A1* | 12/2020 | Litichever | H04L 63/029 |

OTHER PUBLICATIONS

Office Action dated Dec. 16, 2021 issued in Japanese Patent Application No. 2021-017600.
Office Action dated Aug. 16, 2022 issued in Japanese Patent Application No. 2021-017600.

\* cited by examiner

AUTHENTICATION METHOD

BACKGROUND OF INVENTION

1. Field of the Invention

The present invention is related to an authentication method for a mutual authentication between a first entity and a third entity via a second entity, based on an authentication protocol used by the first entity and the third entity, wherein the second entity forwards mutual authentication messages between the first entity and the third entity. The invention is further related to an apparatus configured to perform an authentication method for a mutual authentication between a first entity and a third entity via a second entity, based on an authentication protocol used by the first entity and the third entity, wherein the second entity forwards mutual authentication messages between the first entity and the third entity.

2. Description of Related Art

Authentication techniques are well known in the state of the art. For example, authentication techniques are used to verify the identity of communicating parties in a digital communication. Real end-users are represented in a digital communication by their digital identity and credentials. In the course of a digital communication, the communicating parties often execute a protocol to ensure about each other's identities. Transport Layer Security, also referred to as TLS, is one of the well-known protocols utilized for security communication including the authentication of the parties.

Another example of a well-known protocol that is performed between two entities, a MFDFEV1 tag (MFDFEV1 tag: MIFARE DESFire EV1 tag) and a reader is presented in the following:

1. The Reader first issues an AES (AES: Advanced Encryption Standard) authentication command along with a key number. This will tell the MFDFEV1 tag which AES key to use.
2. The MFDFEV1 tag selects the AES key indicted by the command, generate a 16 byte Random Number B (RndB), and encrypt RndB with the selected AES key. The MFDFEV1 then replies to the authentication command by transmitting an encrypted data packet comprising the encrypted RndB.
3. The Reader receives the reply and goes through the following process:
   (a) Decrypt the encrypted data packet with the AES key, which gives the Reader/Write the RndB that was generated by the MFDFEV1 tag.
   (b) Generate a 16 byte Random Number A (RndA).
   (c) Rotate RndB to the left by 8 bits (1 byte), which gets RndB'.
   (d) Concatenates RndA and RndB' together to create a new 32 byte value.
   (e) Encrypt the resulting 32 byte value with the AES key.
   (f) Transmit the resulting packet comprising the encrypted 32 byte value to the MFDFEV1 tag.
4. The MFDFEV1 tag receives the resulting packet comprising the encrypted 32 byte value and goes through the following process:
   (a) Decrypt the resulting packet with the AES key.
   (b) Split the 32 byte value to get the separate 16 byte values for RndA and RndB'.
   (c) Generate RndB' by rotating the RndB the MFDFEV1 tag generated to the left by 8 bits.
   (d) Compare the received RndB' to the generated RndB'. If they match, then the packet was received correctly and the tag now has the RndA that was generated by the Reader.
   (e) Rotate RndA to the left by 8 bits (1 byte), which gets RndA'.
   (f) Encrypt the 16 byte RndA' value with the AES key.
   (g) Transmit the resulting packet comprising the encrypted 16 byte RndA' value back to the Reader.
5. The Reader receives the resulting packet comprising encrypted 16 byte RndA' value and goes through the following process:
   (a) Decrypt the reply with the AES key, acquiring the RndA' value.
   (b) Generate RndA' by rotating the RndA that was generated to the left by 8 bits.
   (c) Compare the received RndA' to the generated RndA'. If they match, then the authentication process is considered to be successful.
   (d) At this time, a 16 byte AES session key is generated using the bytes of RndA, RndA', RndB, and RndB':

With generating the session key the authentication protocol ends and the authentication is completed.

The afore-mentioned protocol is executed by a product of the MIFARE DESFire family, here a MIFARE DESFire EV1 tag. Further known protocols executed by products of the MIFARE DESFire family are e.g. MIFARE DESFire and MIFARE DESFire EV2.

Executing an authentication protocol is performed using trusted components. Therefore, if the parties are communicating over a wireless channel, such as Near Field Communication, also referred to as NFC, one can rely on a second entity, e.g. a terminal representing a reader to authenticate a first entity, e.g. an NFC device, only when the terminal is security enabled and sufficiently protected against manipulation.

However, secure and well protected terminals are costly devices. It is therefore known in the state of the art to reroute the authentication to a well-protected third entity, e.g. an authenticator. The terminal then only forwards messages between, e.g. the NFC device and the authenticator. Thus, the authentication protocol is executed by the NFC device and the well-protected authenticator. The well-protected authenticator thus takes over the part of the protocol that, without rerouting, the terminal would have executed.

For example, automotive components are often equipped with trusted units such as Hardware Security Modules (HSM) or similar elements, to which the authentication request can be rerouted. A Hardware security Module then functions as an authenticator. This would save costs in the global architecture by avoiding costly terminals and still achieve the security goals.

SUMMARY OF THE INVENTION

Rerouting authentication requests over additional hops, which are often slow in-vehicle communication channels, introduces latency in the response time and could lead to unacceptable performance figures. In that sense, to optimize the timing, the authenticator shall be kept awake, i.e. in High Power Mode, also referred to as HPM, all the time to react as fast as possible to the requests to catch up with the delay introduced by rerouting. This approach also suffers from inefficient energy consumption as well as reduced life time of the authenticator.

It is an object of one aspect of the present invention to overcome at least one of the above-mentioned problems.

According to a first aspect, an authentication method for a mutual authentication between a first entity and a third entity via a second entity, based on an authentication protocol used by the first entity and the third entity, wherein the second entity forwards mutual authentication messages between the first entity and the third entity, comprises:

a) frontloading, by a third entity, a first part of the authentication protocol to the second entity and keeping at least a missing part of the authentication protocol at the third entity (E3, C), the frontloaded first part of the authentication protocol comprising a first encrypted number (c1), the third entity, after frontloading the first part of the authentication protocol, turning from a High Power Mode, also referred to as HPM, into a Low Power Mode, also referred to LPM,
b) initiating the mutual authentication,
c) starting the mutual authentication based on the frontloaded first part of the authentication protocol, starting (104) comprising generating a second encrypted number (c2) by the first entity (E1, Dn), the second encrypted number (c2) comprising content of the first encrypted number (c1),
d) sending, by the second entity, a wake-up signal to the third entity,
e) rerouting, by the second entity, the mutual authentication messages, when the third entity woke up from Low Power Mode, the rerouting (106) comprising transmitting the second encrypted number (c2) from the second entity (E2, T) to the third entity (E3, C) and
f) continuing, by the third entity, after rerouting the mutual authentication messages to the third entity, the mutual authentication based on the missing part of the authentication protocol, the missing part of the authentication protocol comprising instructions for the third entity (E3, C) to derive a session key (S) based on the second encrypted number (c2) and instructions for the first entity (E1, Dn) to derive a session key (S) based on a third encrypted number (c3) generated and transmitted by the third entity (E3, C), the third encrypted number (c3) comprising content of the second encrypted number (c2), and continuing comprising using the respective session keys (S) by the first entity (E1, Dn) and the third entity (E3, C) to exchange authenticated messages between the first entity (E1, Dn) and the third entity (E3, C).

It is understood that a first part of the authentication protocol comprises only a part of the entire authentication protocol based on which the mutual authentication between the first entity and the third entity starts. The missing part is the part of the authentication protocol that represents the remainder to the entire part of the authentication protocol except for the first part of the authentication protocol. It is understood that the missing part comprises the part of the authentication protocol based on which the mutual authentication between the first entity and the third entity is completed. It is further understood that after rerouting in e) the third entity in f) continuous the mutual authentication between the first entity and the third entity based on the missing part of the authentication protocol.

It has been found that by frontloading a first part of the authentication protocol on the second entity, the response time of an authentication method for a mutual authentication between a first entity and a third entity via a second entity, where the second entity forwards mutual authentication messages between the first entity and the third entity can be optimized while allowing the third entity to turn into a Low Power Mode. In the Low Power Mode some parts of the third entity may shut-off completely while other parts stay activated, e.g. to receive messages. It is understood that in the Low Power Mode, the third entity has a lower energy consumption compared to the High Power Mode.

It is further understood that after an initiation in b), the mutual authentication can already start based on the frontloaded first part while the third entity is in Low Power Mode. Furthermore, the lifetime of the third entity or at least of some parts of the third entity may be enhanced since the third entity is allowed to turn to Low Power Mode, and the third entity or at least some parts of the third entity are not forced to stay awake in High Power Mode all the time. It is understood that when the third entity woke up from Low Power Mode it turns into the High Power Mode.

Further advantages of the invention are cost-saving, time optimization and energy efficient realization of well-known authentication protocols, e.g. TLS, also known as Transport Layer Security or protocols executed by products of the MIFARE DESFire family. Moreover, it is understood that the described authentication method can be applied for any known mutual authentication between entities where the second entity forwards mutual authentication messages between the first entity and the second entity.

It is understood that the described authentication method for mutual authentication is carried out by a communication between the respective entities, i.e. an exchange of messages between the respective entities, i.e. mutual authentication messages.

It is further understood that the mutual authentication based on the frontloaded first part of the authentication protocol may be initiated at any moment after the first part of the authentication protocol is frontloaded to the second entity and after the first entity operatively connects to the second entity. The established connection may be detected either by the first entity or the second entity. Thus, b) initiating the mutual authentication may be carried out either by the first entity or the second entity depending on which entity first detects the established connection of the first entity to the second entity.

Therefore, in an embodiment, initiating in b) is carried out by the second entity when detecting that the first entity operatively connects to the second entity. The second entity then may start the mutual authentication by transmitting a request for authentication to the first entity. In another embodiment, initiating in b) is carried out by the first entity when that the first entity operatively connects to the second entity. The first entity then may directly start with the mutual authentication.

It can be intended to improve time efficiency of the authentication method, which means that the response time of the authentication method is further reduced. Therefore, in an embodiment, the second entity, in order to wake up the third entity, performs d) sending the wake-up signal in b) initiating, immediately when the first entity operatively connects to the second entity. Thus, it can be ensured that the third entity wakes up at an earliest possible moment/stage in the authentication process and it can be enabled that the mutual authentication can be rerouted in e) from the second entity to the third entity at an earliest stage in the mutual authentication.

However, it may be advantageous with respect to an enhanced energy efficiency of the method to send the wake-up signal at a proper moment in c) starting. Therefore, in another embodiment, the second entity, in order to wake up the third entity, performs d) sending the wake-up signal while c) starting the mutual authentication based on the frontloaded first part of the authentication protocol.

It is understood that the third entity may inform the second entity to be ready for a rerouting after turning from Low Power Mode into High Power Mode. It is further understood that the first part may be additionally stored by the third entity. It is thus for example possible for the third entity to react fast if something in the transmission of the first part of the authentication protocol to the second entity went wrong. The first part of the authentication protocol may be stored within a secured data storage.

In an embodiment, e) rerouting starts when the third entity woke up from Low Power Mode and thus turns from Low Power Mode into High Power Mode and when the frontloaded first part of the authentication protocol between the second entity and the first entity is completed. Such an embodiment ensures that the whole first part of the authentication protocol is completed before e) rerouting is performed by the second entity. According to this embodiment, the time from sending the wake-up signal to the third entity until the third entity woke up from Low Power Mode and turned into High Power Mode can be used to the best possible extent.

In a further embodiment, a) frontloading a first part of the authentication protocol comprises:
i) pre-generating, by the third entity, the first part of the authentication protocol,
ii) transmitting, by the third entity, the pre-generated first part of the authentication protocol from the third entity to the second entity,
iii) receiving, by the second entity, the pre-generated first part of the authentication protocol from the third entity, and
iv) storing, by the second entity, the received first part of the authentication protocol.

The first part of the authentication protocol can be for example stored, by the second entity, in a data storage or in a cache memory. The data storage may be a secured data storage. In the afore-mentioned embodiment, the third entity may immediately after transmitting the first part of the authentication turn into Low Power Mode.

In an embodiment, a) frontloading comprises generating a first random number and encrypting the first random number to generate a first encrypted number. It is thus understood that in an embodiment, the first part of the authentication protocol comprises an encrypted random number, i.e. the first encrypted number. Because the random number is already encrypted by the third entity, there is no need to meet high security requirements for the second entity. For example, there is no need for secured data storage in the second entity anymore. In such an embodiment, only the third entity may comprise a secured data storage for storing the first random number and/or the first encrypted number. It is thus possible to reduce costs since not every entity must comprise cost intensive secured data storage.

In another embodiment, encrypting the random number comprises using a shared secret of the first entity and the second entity. In a further embodiment, the shared secret is a shared symmetric key, wherein the shared symmetric key is derived using a one-way key derivation function based on pre-shared asymmetric key material of the first entity and the third entity. The word "pre-shared" is to be understood as shared prior to the frontloading of the first part of the authentication protocol. The word asymmetric key material means that a public key and a private key of a respective entity is involved in deriving the shared symmetric key.

Some of the known authentication protocols consume/use shared symmetric keys to generate an encrypted random number. By deriving the shared symmetric key based on pre-shared asymmetric key material of the first entity and the third entity it is both possible to use the known authentication protocols that consume shared symmetric keys and to take advantage of the known advantages of asymmetric keys.

In an embodiment, a) frontloading comprises generating a random number and encrypting the random number with a symmetric key to derive a first encrypted number, wherein the symmetric key is derived by using a one-way key derivation function based on pre-shared asymmetric key material of the first entity and the third entity.

In an embodiment, a) frontloading comprises adding, by the third entity, an identifier to the first part of the authentication protocol. This has the advantage that the first entity may be identified which is especially advantageous if a plurality of first entities take part in the authentication process. To add the identifier to the first part of the authentication protocol, the third entity receives the identifier prior to a) frontloading.

In an embodiment, adding an identifier to the first part of the authentication protocol is performed in i) generating, by the third entity, the first part of the authentication protocol.

It is understood that in an embodiment in which the third entity adds an identifier to the first part of the authentication protocol, the first part of the authentication protocol may comprise the identifier. It is further understood that the identifier may comprise any data for an identification of the first entity. However, in a preferred embodiment, the identifier is a public key associated with the respective first entity and/or a serial number associated with the respective first entity.

The identifier of a respective first entity may be linked to the encrypted random number of the respective first entity. By linking the identifier with an encrypted random number, a tuple can be generated that comprises for a specific first entity an encrypted random number and a respective identifier.

It is understood that in case a plurality of first entities take part in the authentication, for each first entity of the plurality of first entities, a separate first part of an authentication protocol has to be frontloaded to the second entity.

In an embodiment, in which the first part of the authentication protocol comprises an encrypted random number, it is thus advantageous to have for each first entity of a plurality of first entities a tuple comprising an encrypted random number and an identifier. It is thus possible to assign an encrypted random number to the respective first entity. Therefore, in another embodiment, frontloading a first part comprises pre-generating a list of tuples comprising for each first entity in the plurality of first entities a first encrypted number and a corresponding identifier. Thus, it is ensured, that for each first entity in a plurality of first entities a separate tuple can be found within the list and the identifier makes it possible to identify which first encrypted number is assigned to which first entity.

In an embodiment, in which the third entity adds an identifier to the first part of the authentication protocol, b) initiating may comprise transmitting, by the first entity, an identifier associated with the first entity to the second entity and checking, by the second entity, whether the identifier can be found or not. The identifier can be used for example, to decide whether a respective first entity that connects to the second entity is a first entity that takes part in the authentication. Therefore, for example an authentication between the first and the second entity may start only after the first entity transmitted an identifier to the second entity, a respective identifier of the first entity is found by the second entity.

It is understood that in an embodiment in which a tuple or a list of tuples is comprised within the first part of the authentication protocol, checking, by the second entity whether the identifier can be found may comprise checking whether a tuple can be found that comprises the identifier. It is further understood that if the second entity after receiving the identifier from the first entity does not find the respective identifier within the frontloaded first part of the authentication protocol, the second entity may perform any proper reaction. For example, the second entity may perform transmitting an error message to the first entity, indicating that something went wrong and/or stopping communication between the first and the second entity. If the second entity finds the identifier within the first part of the authentication protocol, the second entity in an embodiment may in c) starting the mutual authentication, by transmitting the first part of the authentication protocol to the first entity.

The identifier may also be used to enhance the robustness of the method against accidently sending a wake-up signal to the third entity and to further optimize energy efficiency. Therefore, in an embodiment, in which the third entity adds an identifier to the first part of the authentication protocol, the authentication method in d) sending a wake-up signal, by the second entity, is performed after finding an identifier associated with the first entity. Hence, if the first entity cannot be identified by the second entity based on the identifier, there is no need for the second entity to send a wake-up signal to the third entity and the third entity does not need to turn from Low Power Mode to High Power Mode.

In an embodiment, in which the frontloaded first part of the authentication protocol is transmitted, by the second entity, to the first entity, c) starting may comprise after receiving, by the first entity, the first part of the authentication protocol, preparing a reply to the received first part of the authentication protocol. It is understood that in an embodiment in which an identifier is added to the first part of the authentication protocol, there is no need for the second entity to transmit in addition to the first part of the authentication the identifier to first entity.

It is further understood that in an embodiment that comprises a first encrypted number, the method may comprise receiving by the first entity the first encrypted number and preparing a reply to the received first encrypted number.

In an embodiment, preparing a reply may comprise:
generating, by the first entity, a second random number,
encrypting, by the first entity, the generated second random number,
decrypting, by the first entity, the first encrypted number to derive the first random number,
applying, by the first entity, a mathematical function on the first random number to receive a modified first random number,
encrypting, by the first entity, the second random number and the modified first random number together to generate a second encrypted number and
transmitting, by the first entity, the second encrypted number to the second entity.

It has been found that generating a random number consumes a lot of time in the mutual authentication between entities. Therefore, with respect to time efficiency, in an embodiment, generating a second random number comprises pre-generating the second random number prior to c) starting the mutual authentication and storing the pre-generated second random number in a secured area at the first entity. It is understood that the secured area may be a secured data storage.

To enhance the security of the described method, in an embodiment, in which the frontloaded first part of the authentication protocol is transmitted, by the second entity, to the first entity, c) starting may comprise after transmitting the first part of the authentication protocol, by the second entity, deleting the first part of the authentication protocol, by the second entity. It is understood that in an embodiment in which the first part of the authentication protocol comprises a first encrypted number and an identifier, deleting the first part of the authentication protocol may comprise remain the identifier and only deleting the first encrypted number.

In an embodiment, the second entity after deleting the first part of the authentication protocol and after the third entity turned into High Power Mode performs requesting from the third entity a new first part of the authentication protocol. Thus, a next mutual authentication between the first and the third entity is based on the new first part of the authentication protocol. By deleting the first part of the authentication protocol and requesting a new first part of the authentication protocol, it is ensured that the first part of the authentication protocol is only used once for communication. It is understood that the third entity after receiving the request for a new first part of the authentication protocol may transmit the new first part of the authentication protocol to the second entity at a proper moment after receiving the request. In an embodiment, the third entity performs transmitting the new first part of the authentication protocol after f) continuing. In an embodiment, transmitting the new first part of the authentication protocol may comprise transmitting an updated tuple of an identifier and a new first encrypted number.

In a further embodiment, the third entity without receiving a request for a new first part of the authentication protocol performs transmitting the new first part of the authentication protocol after f) continuing. It is understood that in such an embodiment, the second entity does not need to send a request a new first part of the authentication protocol, the third entity performs transmitting the new first part of the authentication protocol automatically after f) continuing without a trigger message.

In an embodiment, c) starting the mutual authentication comprises:
the first entity:
receiving, a first encrypted number, transmitted from the second entity,
decrypting the first encrypted number to receive the first random number
applying a mathematical function on the first random number to derive a modified first random number,
generating a second random number,
encrypting the modified first random number and the second random number to derive a second encrypted number, and
transmitting the second encrypted number to the second entity.

It is understood that the second encrypted number comprises two parts, the modified first random number and the second random number.

In an embodiment, the second random number is encrypted based on a shared secret derived from a private key associated with the first entity and a public key associated with the third entity.

In an embodiment, the shared secret is a shared symmetric key, wherein the shared symmetric key is derived, by applying a one-way key derivation function on the private key associated with the first entity and the public key associated with the third entity. It is understood that the private key associated with the first entity and the public key associated with the third entity represent asymmetric key material that is used in accordance with the key derivation function to derive shared symmetric keys. It is therefore possible to use the known advantages of asymmetric keys.

In an embodiment, the second entity, after receiving the second encrypted number, may perform waiting until the third entity is in High Power Mode HPM for transmitting the second encrypted number together with the identifier associated to the respective first entity to the third entity. It is understood that the second entity may wait for transmitting the second encrypted number and the identifier associated to the respective first entity to the third entity until the third entity indicates that it turned into High Power Mode (HPM), e.g. by transmitting a message to the second entity with an indication that the third entity is in High Power Mode.

In an embodiment, e) rerouting, by the second entity, the mutual authentication from the second entity to the third entity comprises:
transmitting the received second encrypted number together with a respective identifier associated with the first entity to the third entity.

It is understood that f) continuing, by the third entity, the mutual authentication starts after the third entity turned into High Power Mode and after receiving, by the third entity, the second encrypted number together with a respective identifier associated with the first entity from the second entity.

In an embodiment, f) continuing, by the third entity, the mutual authentication comprises:
locking the stored first random number and the first encrypted number associated with a respective identifier,
decrypting the second encrypted number to receive the second random number and the modified first random number,
applying a respective reverse mathematical function on the modified first random number to derive the first random number, and
comparing the stored first random number to the first random number to which the reverse mathematical function is applied.

Locking here means that the stored first random number and the stored first encrypted random number associated with a respective identifier cannot be overwritten, deleted or transmitted to the second entity until it is unlocked. Such an embodiment improves the security of the described authentication method.

In an embodiment, after the third entity turned into High Power Mode and while f) continuing, by the third entity, the mutual authentication based on the missing part of the authentication protocol, the second entity functions as a gateway or an intermediate node or a relay between the first entity and the third entity. It is to be understood that the second entity after e) rerouting in an embodiment may only forward the respective communication between the first and the third entity by receiving and directly transmitting received messages from and to the respective entity.

In an embodiment, the third entity, after comparing the stored first random number to the first random number to which the reverse mathematical function is applied choosing one of:
A) aborting the communication, if the stored first random number does not match to the first random number to which the reverse mathematical function is applied, and
B) continuing, by the third entity, the mutual authentication until the missing part of the authentication protocol is completed, if the stored first random number match to the first random number to which the reverse mathematical function is applied.

In an embodiment B) continuing, by the third entity, the mutual authentication comprises:
applying a mathematical function on the received second random number to derive a modified second random number,
encrypting the modified second random number to derive a third encrypted number,
transmitting the third encrypted number to the second entity, and
generating a session key based on the first random number and the second random number.

In an embodiment in which the third entity performs locking the stored first random number and the first encrypted number associated with the identifier, B) continuing, by the third entity, the mutual authentication further comprises:
applying a mathematical function on the received second random number to derive a modified second random number,
encrypting the modified second random number to derive a third encrypted number,
transmitting the third encrypted number to the second entity,
generating a session key based on the first random number and the second random number,
unlocking the stored first random number and the first encrypted number associated with a respective identifier,
re-generating a new first random number and encrypting the random number to receive a new first encrypted number, and
transmitting the new first encrypted number associated with a respective identifier.

It is understood that re-generating a new first random number may comprise deleting the first random number prior to generating a new first random number or overwriting the first random number by the new first random number. It is further understood that transmitting the new first encrypted number associated with a respective identifier may comprise update a tuple in the second entity.

In an embodiment, the second entity, after receiving the third encrypted number performs forwarding the third encrypted number to the first entity.

In a further embodiment, the first entity, after receiving the third encrypted number performs:
decrypting the received third encrypted number to receive the modified second random number,
applying a respective reverse mathematical function on the modified second random number to derive the second random number, and
comparing the stored second random number to the second random number to which the reverse mathematical function is applied.

It is understood that in order to improve time efficiency in an embodiment, the third entity may generate the session key while the first entity receives the third encrypted number and while the first entity processes the third encrypted number, e.g. decrypting, applying a respective reverse mathematical function and comparing. However, it is further understood that with respect to time efficiency, in an embodiment, the third entity may already generate the session key while transmitting the third encrypted number to the second entity.

In an embodiment, the first entity, after comparing the stored second random number to the second random number to which the reverse mathematical function is applied, choosing one of:
A) aborting the communication, if the stored second random number does not match to the second random number to which the reverse mathematical function is applied, and
B) generating a session key based on the first random number and the second random number, if the stored first random number match to the first random number to which the reverse mathematical function is applied.

It is understood that the authentication is completed after the first entity and the third entity generate respective session keys. Both entities are thus mutual authenticated and can based on the respective session key exchange authenticated messages.

A second aspect of the invention deals with a method to perform a mutual authentication between a first entity and a third entity via a second entity, based on an authentication protocol used by the first entity and the third entity, wherein the second entity forwards mutual authentication messages between the first entity and the third entity, the method comprising:
a) frontloading, by the third entity, a first part of an authentication protocol to the second entity, the frontloaded first part of the authentication protocol comprising a first encrypted number (c1),
b) receiving, by the third entity from the second entity, an indication to continue the mutual authentication, and
c) continuing, by the third entity, the mutual authentication based on the missing part of the authentication protocol, continuing (107) starts after receiving a second encrypted number (c2) from the second entity (E2, T), the second encrypted number (c2) comprising content of the first encrypted number (c1), the missing part of the authentication protocol comprising instructions for the third entity (E3, C) to derive a session key S based on the second encrypted number (c2) and instructions for the first entity (E1, Dn) to derive a session key S based on a third encrypted number (c3) generated and transmitted by the third entity (E3, C), the third encrypted number (c3) comprising content of the second encrypted number (c2), and continuing comprising using the respective session keys S by the first entity (E1, Dn) and the third entity (E3, C) to exchange authenticated messages between the first entity (E1, Dn) and the third entity (E3, C).

A third aspect of the invention deals with a method to perform a mutual authentication between a first entity and a third entity via a second entity, based on an authentication protocol used by the first entity and the third entity, wherein the second entity forwards mutual authentication messages between the first entity and the third entity, the method comprising:
a) receiving, by the second entity a first part of an authentication protocol, the first part of the authentication protocol comprising a first encrypted number (c1),
b) starting, by the second entity, the mutual authentication based on the frontloaded first part of the authentication protocol, when a first entity connects to the second entity, starting (104) additionally comprising generating a second encrypted number (c2) by the first entity (E1, Dn), the second encrypted number (c2) comprising content of the first encrypted number (c1), and
c) rerouting, by the second entity, the mutual authentication messages to the third entity, the rerouting (106) comprising transmitting the second encrypted number (c2) from the second entity (E2, T) to the third entity (E3, C).

A one aspect of the invention is directed to a vehicle comprising a second entity configured to perform a method according to the invention and/or a third entity configured to perform a method according to the invention.

According to one aspect of the invention, a data processing system is comprising a processor configured to perform the authentication method in accordance to the present invention.

According to one aspect of the invention, a computer program product comprises instructions which, when the program is executed by a computer, cause the computer to carry out the authentication method in accordance to the present invention.

According to one aspect of the invention, a computer-readable data storage medium comprises instructions which, when executed by a computer, cause the computer to carry out the authentication method in accordance to the present invention.

It is understood that in an embodiment, the first entity may be represented by a device, e.g. a Near Field Communication device, also referred to as NFC device, and the method is provided for Near Field communication, also referred to as NFC. In an embodiment, the first entity is an NFC device in a mobile phone or a hardware token with an NFC device, e.g. a hardware token implemented in a key or an NFC card. However, the authentication method according to the present invention is not restricted to NFC devices. It is understood that the first entity may be any device to be used in an authentication method as described.

In an embodiment, the second entity is a terminal, i.e. a reader, e.g. an Electronic Control Unit, also referred to as ECU, in a door of a vehicle.

In an embodiment, the third entity is a security controller, e.g. a Hardware Security Module, also referred to as HSM.

It is understood that the present application can be used for all kinds of physical access control systems, e.g. door lock, and other Internet of Things devices, also referred to as IoT devices, which do not meet high security requirements.

BRIEF DESCRIPTION OF THE DRAWINGS

Further features of the present invention will become apparent from the following description and the appended claims in conjunction with the figures.

DETAILED DESCRIPTION OF THE PRESENTLY PREFERRED EMBODIMENTS

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

Figure 1:
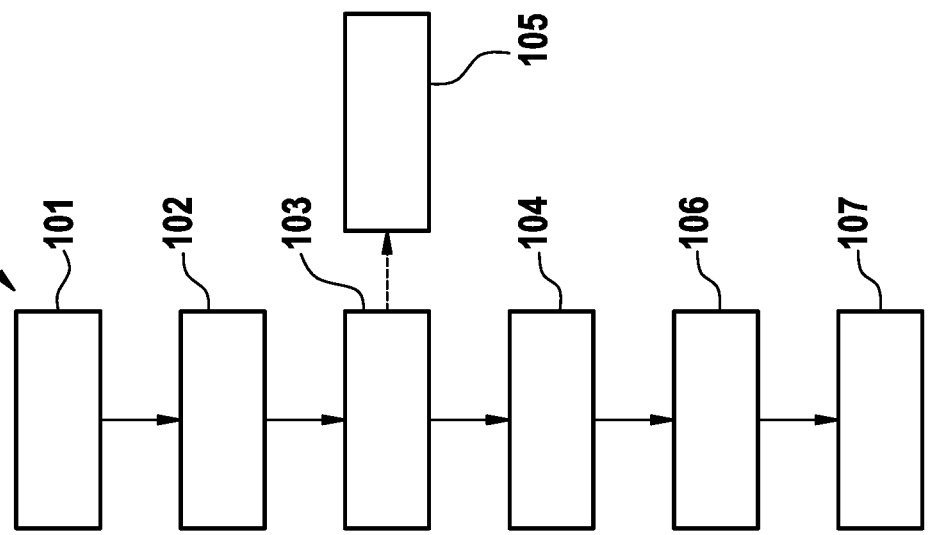
FIG. 1 is a flowchart of an authentication method of the invention.

FIG. 1 is a flowchart of an authentication method 100 according to a first embodiment of the present application.

In a first step 101 of the authentication method 100, a first part of the authentication protocol, i.e. a first part of the protocol is frontloaded, by the third entity E3, C to the second entity E2, T. A missing part of the authentication protocol is kept at the third entity E3, C.

In a second step 102, after frontloading 101 the first part of the protocol to the second entity E2, T, the third entity E3, C turns into a Low Power Mode LPM.

In a third step 103 that can take place at any moment after the first part of the protocol is frontloaded to the second entity E2, T, the first entity E1, Dn connects to the second entity E2, T and thus initiates the mutual authentication between the first entity E1, Dn and the third entity E3, C.

In a fourth step 104, the mutual authentication starts based on the frontloaded first part of the protocol.

In a fifth step 105, the second entity E2, T, immediately after the first entity E1, Dn connects to the second entity E2, T, sends a wake-up signal to the third entity E3, C.

In a sixth step 106, the second entity E2, T reroutes the mutual authentication messages after the third entity E3, C turned from Low Power Mode into High Power Mode and after the mutual authentication based on the frontloaded first part of the protocol between the second entity E2, T and the first entity E1, Dn is completed.

In a seventh step 107, the third entity E3, C, after the mutual authentication messages were rerouted, continues the mutual authentication between the first entity E1, Dn and the third entity E3, C based on the missing part of the protocol.

The missing part of the authentication protocol comprises instructions for the third entity E3, C to derive a session key S and instructions for the first entity E1, Dn to derive a session key S which is described further below.

Figure 3A:
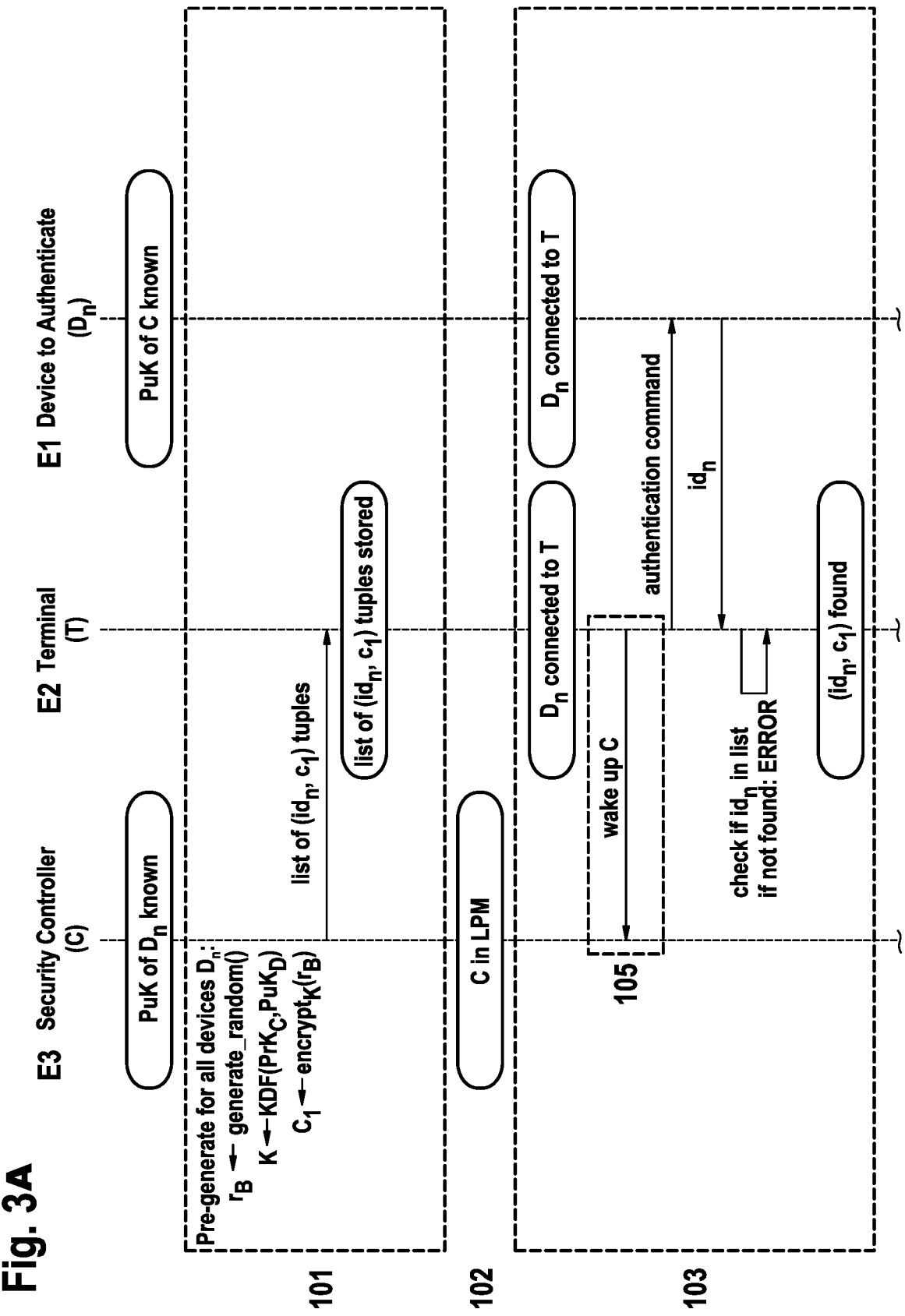
FIG. 3A-3B schematically illustrates a system that performs the authentication method according to FIG. 1.
Figure 3B:
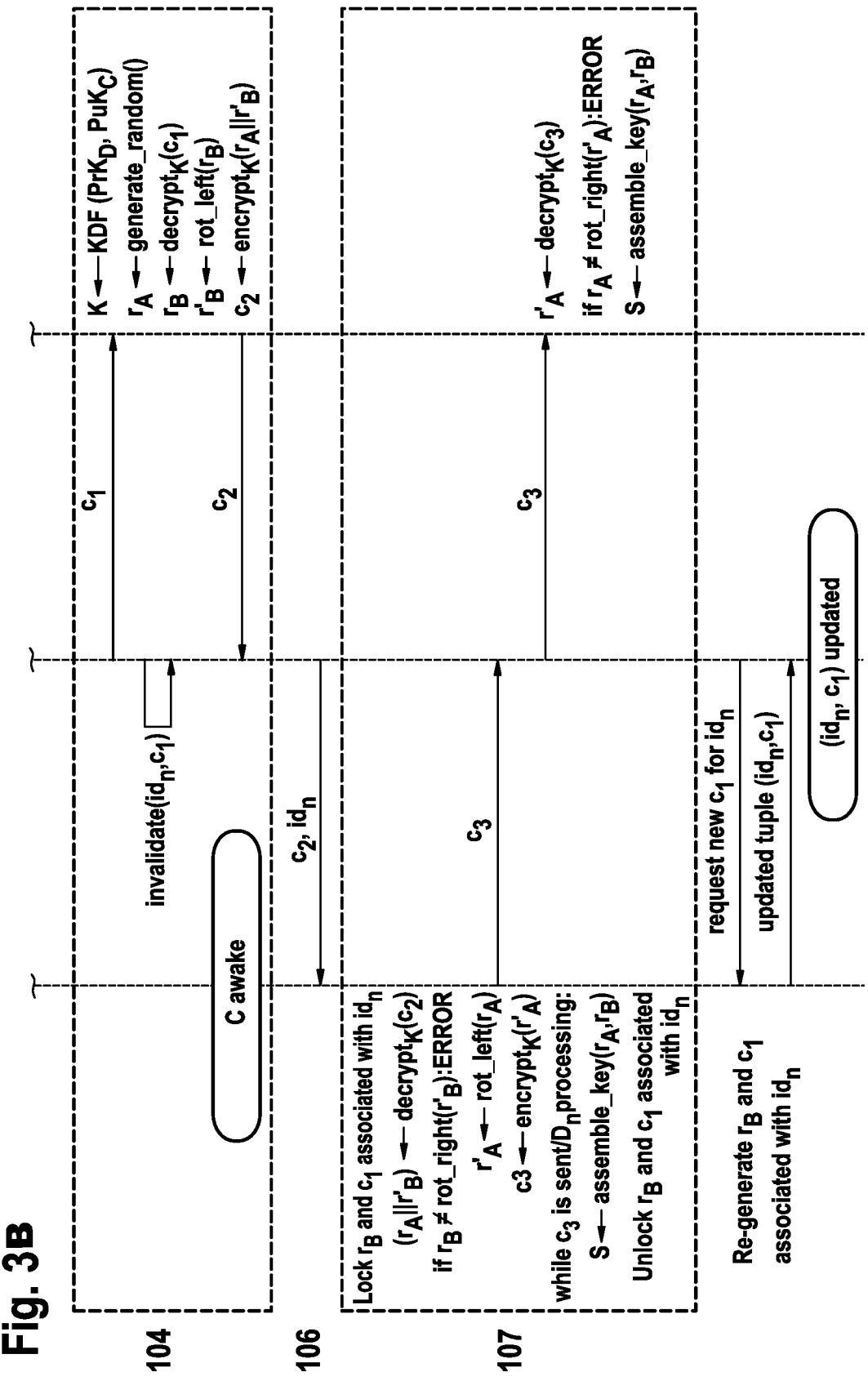

The steps 101 to 107 according to FIG. 1 are shown in more detail in FIGS. 3A-3B.

In FIG. 1 in the step 101 the third entity E3, C generates the first part of the protocol and transmits the first part of the protocol to the second entity E2, T. The second entity E2, T after receiving the first part of the protocol stores it in a data storage.

The first part of the protocol is generated by the third entity E3, C in that it generates a first random number rB and encrypts the first random number rB to receive a first encrypted number c 1. The random number rB and the first encrypted number c1 is stored by the third entity E3, C in a secured data storage.

For encrypting the first random number rB, the third entity E3, C uses a symmetric key K. This symmetric key K is derived by the third entity E3, C, by applying a one-way key derivation function KDF on a private key PrKC of the third entity E3, C and a public key PuKDn of the first entity E1, Dn. The public key PuKDn of the first entity E1, Dn is received by the third entity E3, C prior to step 101 frontloading and is thus known to the third entity E3, C.

After the first encrypted number c1 is stored by the third entity E3, C, the third entity E3, C adds the public Key PuKDn of the first entity E1, Dn to the first encrypted number c1. The PuKDn of the first entity E1, Dn is used as an identifier idn for the first entity E1, Dn. Thus, the third entity E3, C generates a tuple of data, comprising the identifier idn associated with the first entity E1, Dn and the first encrypted number c1.

Since a plurality of first entities are involved in the mutual authentication, the third entity E3, C generates a list of tuples that comprises for each first entity E1, Dn in the plurality of first entities a different tuple with a first encrypted number c1 and a corresponding identifier idn.

After generating the list of tuples, it is transmitted, by the third entity E3, C to the second entity E2, T and after the list of tuples is received by the second entity E2, T, it is stored, by the second entity E2, T, within the data storage. The first part of the protocol thus comprises the list of tuples. After the list is transmitted and stored, the third entity E3, C in step 102 turns into a Low Power Mode LPM.

Immediately, after a first entity E1, Dn in step 103 connects to the second entity E2, T and the second entity E2, T detects the connection, the second entity E2, T in step 105 sends a wake-up signal to the third entity E3, C. The mutual authentication is thus initiated in step 103. After sending the wake-up signal in step 105, the second entity E2, T in step 103 transmits an authentication request to the first entity E1, Dn. As a reply to the authentication request, the first entity E1, Dn transmits the public key PuKDn of the first entity E1, Dn that serves as an identifier idn for the first entity E1, Dn to the second entity E2, T.

The second entity E2, T checks whether the public key PuKDn of the first entity E1, Dn can be found within the stored list of tuples or not. If the public key PuKDn of the first entity E1, Dn cannot be found within the list of tuples and the first entity E1, Dn cannot be identified, the second entity E2, T will send an error message to the first entity E1, Dn and stop the communication with the first entity E1, Dn.

If the public key PuKDn of the first entity E1, Dn can be found within the list of tuples, the second entity E2, T will transmit the respective first encrypted number c1 that can be found within the tuple together with the public key PuKDn of the first entity E1, Dn, to the first entity E1, Dn to start the mutual authentication based on the first part of the protocol in step 104.

After transmitting the first encrypted number c1, the second entity E2, T deletes the first encrypted number c1 and will request a new first encrypted number c1 at a proper moment (see below).

After receiving the first encrypted number c1, the first entity E1, Dn prepares a reply for the mutual authentication based on the first part of the protocol. For preparing the reply, the first entity E1, Dn generates a second random number rA and decrypts the first encrypted number c1 to derive the first random number rB. The second random number rA may be pre-generated by the first entity E1, Dn and stored in a secured data storage. Furthermore, the first entity E1, Dn applies a mathematical function to the derived first random number rB. The mathematical function rotates the bits of the derived first random number rB eight bits to the left and wrap around overflowing bits. Thus, a modified first random number rB' is derived. A concatenation rA||rB' of the second random number rA and the modified first random number rB' is then encrypted by the second entity E2, T to receive a second encrypted number c2.

To receive the second encrypted number c2, the second entity E2, T encrypts the concatenation rA||$r_B$' of the second random number rA and the modified first random number rB' by using a symmetric key K. This symmetric key K is derived by the first entity E1, Dn, by applying a one-way key derivation function (KDF) on a private key PrKDn of the first entity E1, Dn and a public key PuKC of the third entity E3, C. The public key PuKC of the third entity E3, C is received by the first entity E1, Dn prior to step 101 frontloading and is thus known to the first entity E1, Dn. The first entity E1, Dn then transmits the second encrypted number c2 to the second entity E2, T.

After receiving the second encrypted number c2, by the second entity E2, T, the mutual authentication based on the frontloaded first part of the protocol is completed. The second entity E2, T then waits for the third entity E3, C to turn into High Power mode, if the third entity E3, C not already turned into High Power Mode.

After the third entity E3, C turned into High Power Mode, the second entity E2, T in step 106 reroutes the mutual authentication messages to the third entity E3, C by transmitting a tuple that comprises the second encrypted number c2 and the public key PuKDn of the first entity E1, Dn to the third entity E3, C.

After rerouting in step 106, the third entity E3, C in step 107 continuous the mutual authentication between the first entity E1, Dn and the third entity E3, C based on the missing part of the authentication protocol. The second entity E2, T after rerouting in step 106 functions as a gateway by only forwarding received messages between the first entity E1, Dn and the third entity E3, C.

The third entity E3, C after receiving the second encrypted number c2, locks the stored first random number and the stored first encrypted number c1 associated with the received public key PuKDn of the first entity E1, Dn that serves as an identifier idn for the first entity E1, Dn. The third entity E3, C then decrypts the second encrypted number c2 to derive the concatenation rA||rB' of the second random number rA and the modified first random number rB'.

The third entity E3, C then applies a reverse mathematical function to the modified first random number rB' to derive the first random number rB to which the first entity E1, Dn applied the mathematical function. The reverse mathematical function rotates the bits of the modified first random number rB' eight bits to the right and wrap around overflowing bits. Afterwards, the third entity E3, C compares the first random number rB to which the first entity E1, Dn applied the mathematical function with the stored first random number rB. If the compared random numbers do not match, the third entity E3, C transmits an error message and aborts the communication between the first entity E1, Dn and the third entity E3, C.

If the compared random numbers match, then the third entity E3, C will continue the mutual authentication, by applying a mathematical function on the received second random number rA to derive a modified second random number rA', encrypting the modified second random number to derive a third encrypted number c3, transmitting the third encrypted number c3 to the second entity E2, T. While transmitting the third encrypted number c3 to the second entity E2, T, the third entity performs generating a session key S based on the first random number rB and the second random number rA. The modification is the same as applied to the first random number.

The second entity E2, T, that in this stage functions as a gateway, after receiving the third encrypted number c3 performs forwarding the third encrypted number c3 to the first entity E1, Dn without any further processing of the third encrypted number c3.

The first entity E1, Dn, after receiving the third encrypted number c3 performs decrypting the received third encrypted number c3 to receive the modified second random number rA', applying a respective reverse mathematical function on the modified second random number rA' to derive the second random number rA, and comparing the stored second random number rA to the second random number to which the reverse mathematical function is applied.

If the compared random numbers do not match, the first entity E1, T transmits an error message and aborts the communication between the first entity E1, Dn and the third entity E3, C.

If the compared random numbers match, then the first entity E1, Dn will perform generating a session key S based on the first random number and the second random number.

The mutual authentication is completed after the first entity E1, Dn and the third entity E3, C generated the respective session keys S.

The third entity E3, C may at any proper moment after generating the session key S perform unlocking the locked stored first random number rB and the locked stored first encrypted number c1 associated with the identifier idn, here the public key PuKDn of the first entity E1, Dn.

After the second entity E2, T received the third encrypted number c3 and forwarded it to the first entity E1, Dn, the second entity E2, T performs requesting from the third entity E3, C a new first encrypted number c1 associated with the respective identifier idn.

The third entity E3, C, after receiving the request for a new first encrypted encrypted number and after unlocking the stored random number rB and the first encrypted number c1 performs re-generating a new first random number and encrypting the new first random number to generate a new first encrypted number. Re-generating here comprises overwriting the unlocked stored first random number rB and the unlocked first encrypted number c1 by replacing the respective numbers by the new ones. Thus, an updated tuple comprising the new first encrypted number and the associated identifier, here the public key PuKDn of the first entity E1, Dn is generated.

After re-generating, the third entity E3, C performs transmitting the updated tuple to the second entity E2, T. The second entity E2, T after receiving the updated tuple stores the updated tuple in the data storage by overwriting the respective stored identifier associated with the respective first entity or by simply storing the new first encrypted number in association with the respective stored identifier associated with the respective first entity.

Figure 2:
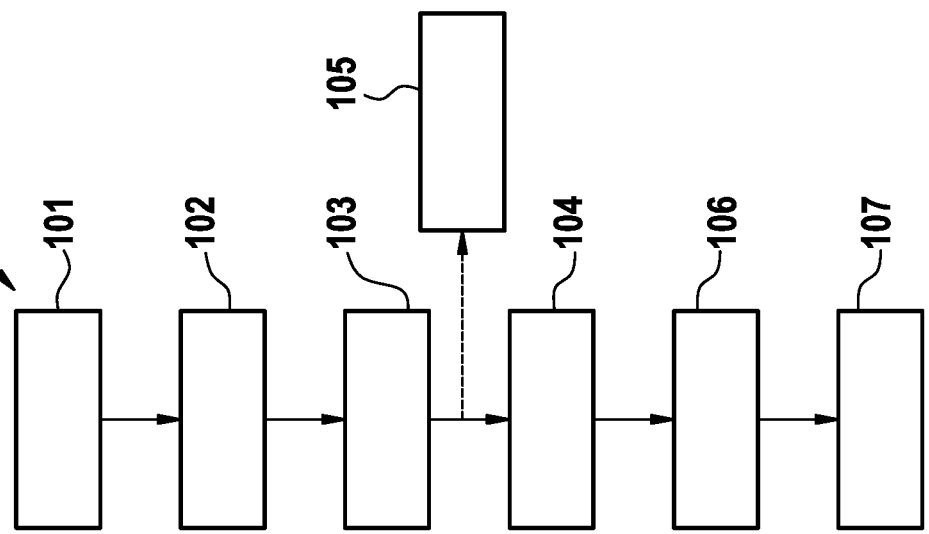
FIG. 2 is a flowchart of an authentication method of the invention.

FIG. 2 is a flowchart of an authentication method 100 according to a second embodiment of the present application.

FIG. 2 differs from FIG. 1 in that the first entity E1, Dn after detecting the connection with the second entity E2, T and thus initiating in step 103 the mutual authentication, directly transmits the public key PuKDn of the first entity E1, Dn that serves as an identifier idn for the first entity E1, Dn to the second entity E2, T. Furthermore, FIG. 2 additionally differs from FIG. 1 in that the second entity E2, T in step 105 sends the wake-up signal after checking in step 103 whether the public key PuKDn of the first entity E1, Dn can be found within the stored list of tuples or not. If the public key PuKDn of the first entity E1, Dn cannot be found within the list of tuples and the first entity E1, Dn cannot be identified, the second entity E2, T will simply send an error message to the first entity E1, Dn and stop the communication with the first entity E1, Dn without sending a wake-up signal to the third entity E3, C.

Only if the public key PuKDn of the first entity E1, Dn can be found within the list of tuples, the second entity E2, T, after finding the public key PuKDn of the first entity E1, Dn sends a wake-up signal to the third entity E3, C.

Figure 4A:
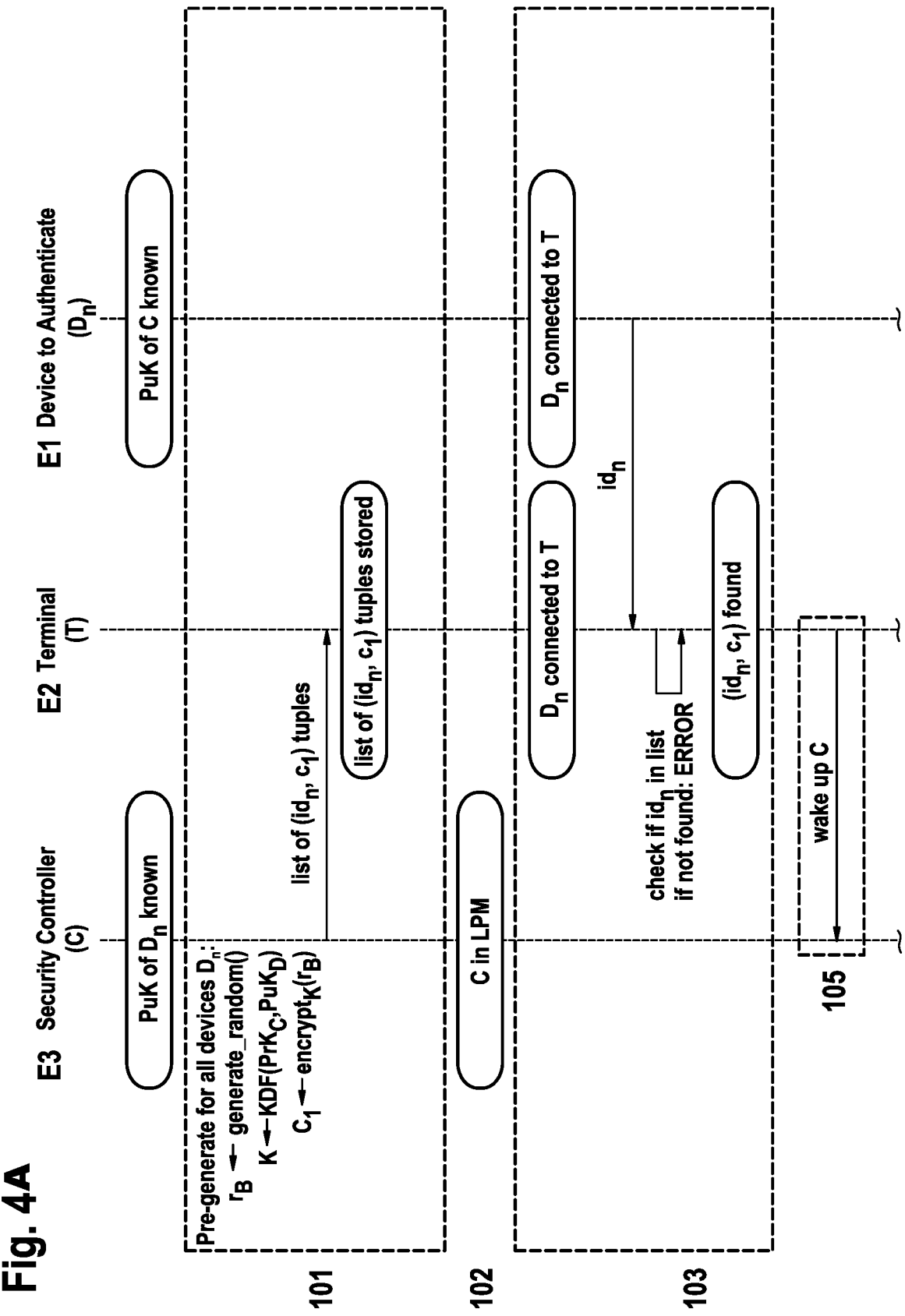
FIG. 4A-4B schematically illustrates a system that performs the authentication method according to FIG. 2.
Figure 4B:
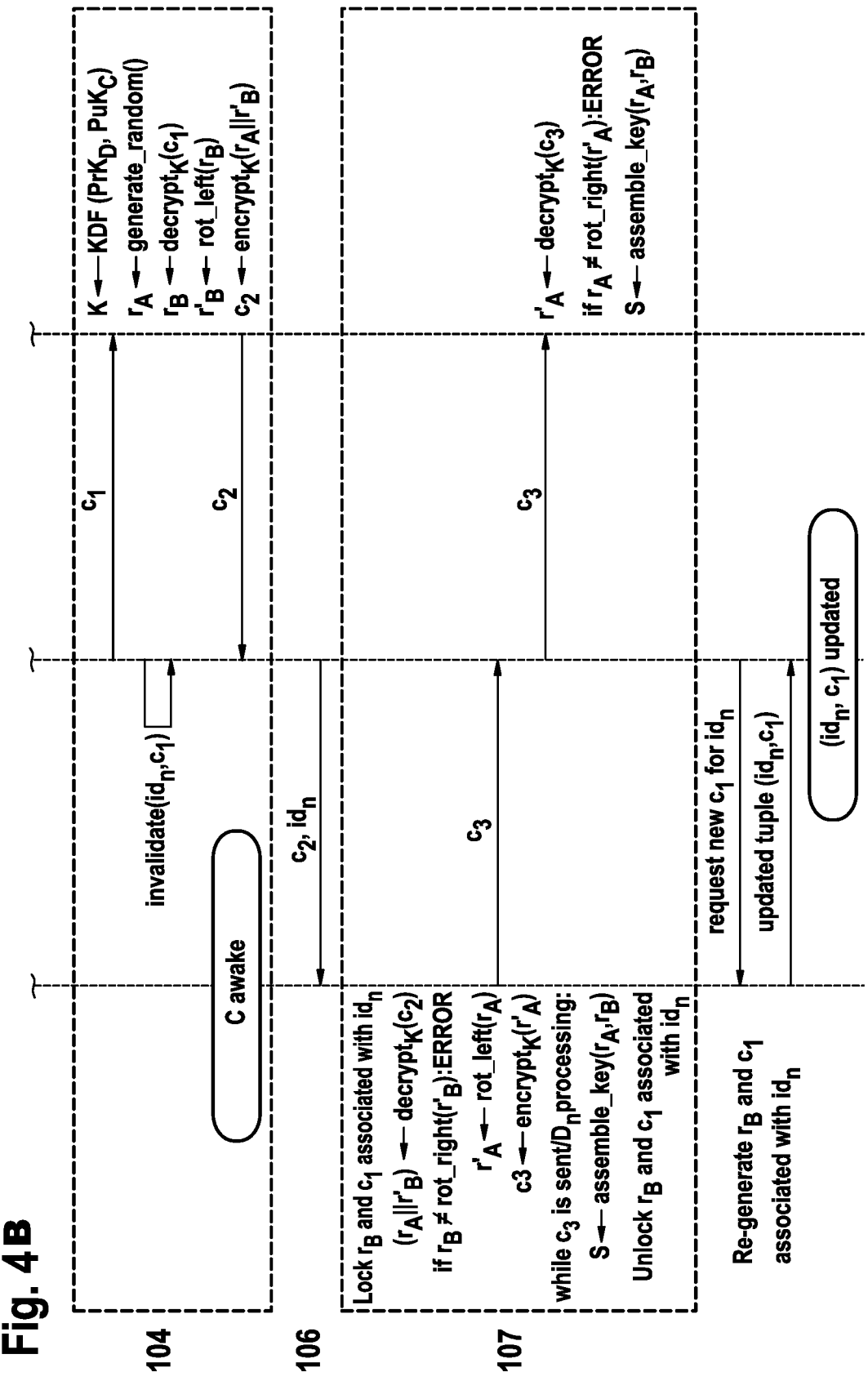

The steps 101 to 107 according to FIG. 2 are shown in more detail in FIGS. 4A-4B.

FIG. 3, which spans two pages as FIGS. 3A and 3B, schematically illustrates in detail a system that performs the authentication method according to the first embodiment shown in FIG. 1. The system comprises a first entity E1, a second entity E2 and a third entity E3. The first entity E1 is represented by a device to authenticate $D_n$, e.g. an NFC device. The device $D_n$ is a first device within a plurality of devices $D_n$ with n=1, 2, 3, ... devices. The second entity E2 is represented by a terminal T, e.g. a receiver in the door of a vehicle. The third entity E3 is represented by a security controller C, e.g. a Hardware security Module HSM inside the vehicle. Both, the second entity E2, T and the third entity E3, C are implemented in an in-vehicle network.

The first entity E1, Dn performs the steps in accordance with the dotted vertical line on the right. The second entity E2, T performs the steps in accordance with the dotted vertical line in the middle and the third entity E3, C performs the steps in accordance with the dotted vertical line on the left. The arrows between the dotted lines that respectively link two dotted vertical lines indicate an interaction, i.e. a communication, of the respective two entities.

FIG. 4, which spans two pages as FIGS. 4A and 4B, schematically illustrates in detail a system that performs the authentication method according to the second embodiment shown in FIG. 2. FIG. 4 thus only differs from FIG. 3 in that the first entity E1, Dn in step 103 after detecting the connection with the second entity E2, T directly transmits the public key PuKDn of the first entity E1, Dn to the second entity E2, T. The public key PuKDn of the first entity E1, Dn serves as an identifier idn for the first entity E1, Dn. Furthermore, FIG. 4 additionally differs from FIG. 3 in that the second entity E2, T in step 105 sends the wake-up signal after checking in step 103 whether the public key PuKDn of the first entity E1, Dn can be found within the stored list of tuples or not. If the public key PuKDn of the first entity E1, Dn cannot be found within the list of tuples and the first entity E1, Dn cannot be identified, the second entity E2, T will simply send an error message to the first entity E1, Dn and stop the communication with the first entity E1, Dn without sending a wake-up signal to the third entity E3, C.

Only if the public key PuKDn of the first entity E1, Dn can be found within the list of tuples, the second entity E2, T, after finding the public key PuKDn of the first entity E1, Dn sends a wake-up signal to the third entity E3, C.

Figure 5A:
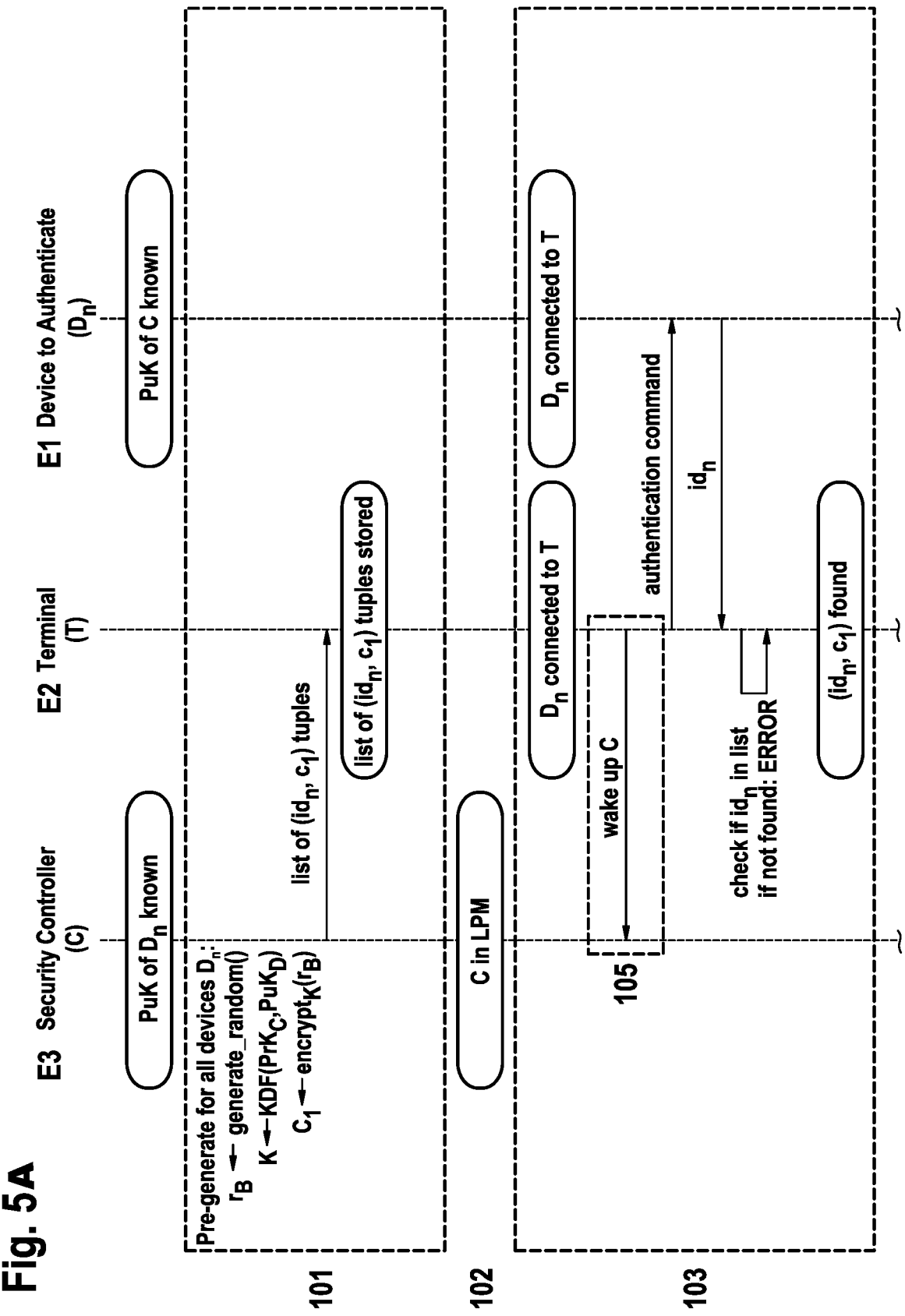
FIG. 5A-5B schematically illustrates a system that performs the authentication method performing the method shown in FIG. 1.
Figure 5B:
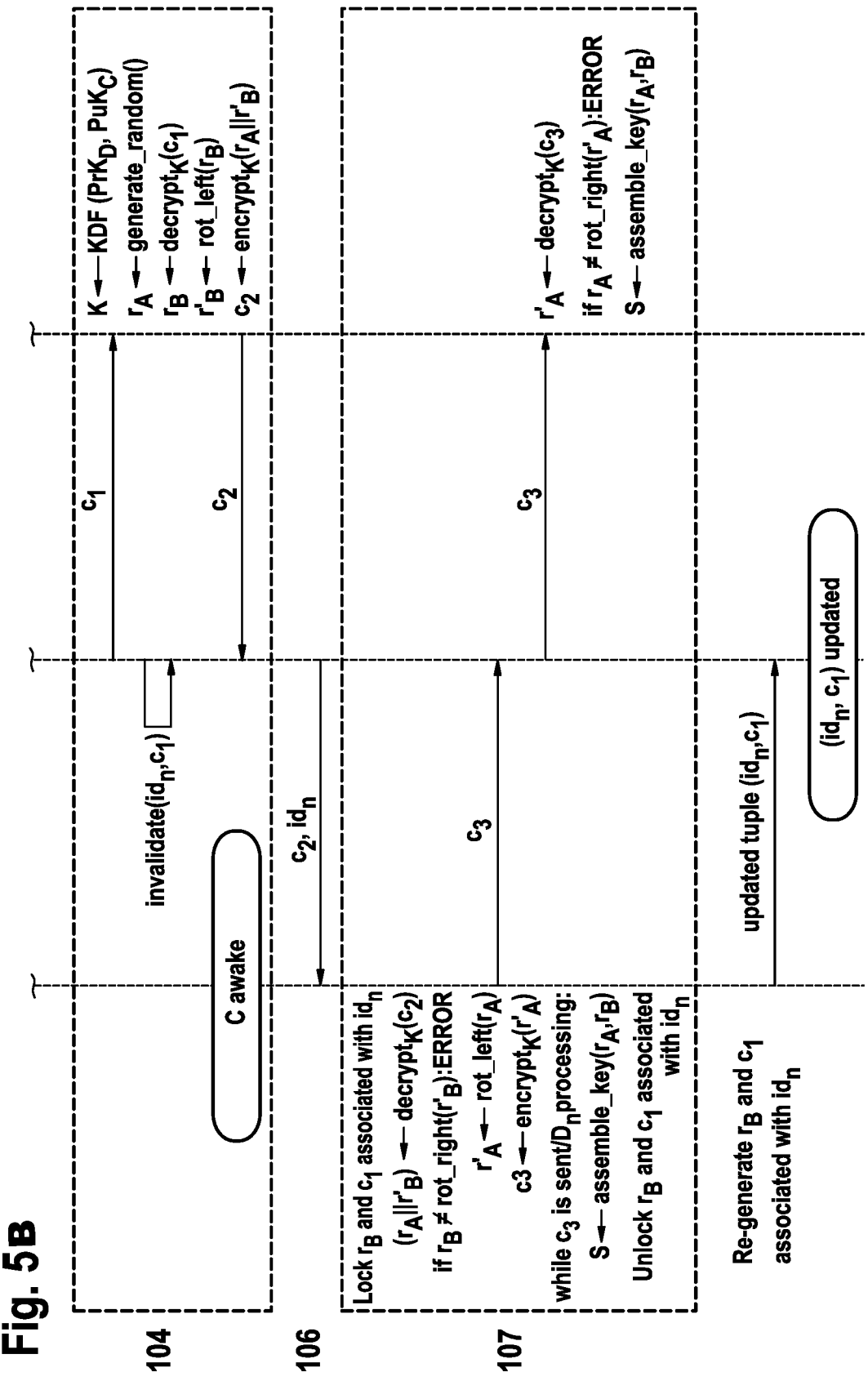

FIG. 5, which spans two pages as FIGS. 5A and 5B, schematically illustrates an alternative embodiment to the embodiment shown in FIG. 3, performing an alternative embodiment of the method shown in FIG. 1.

The only difference to FIG. 3 and thus to the method described with FIG. 1 is that the third entity E3, C in FIG. 5 automatically after unlocking the stored first random number rB and unlocking the stored first encrypted number c1 performs re-generating a new first random number, encrypting the new first random number to derive a new first encrypted number and transmitting an updated tuple to the second entity E2, T. The third entity E3, C here may not wait until it receives a request from the second entity E2, T to transmit an updated tuple comprising a new first encrypted number.

Figure 6A:
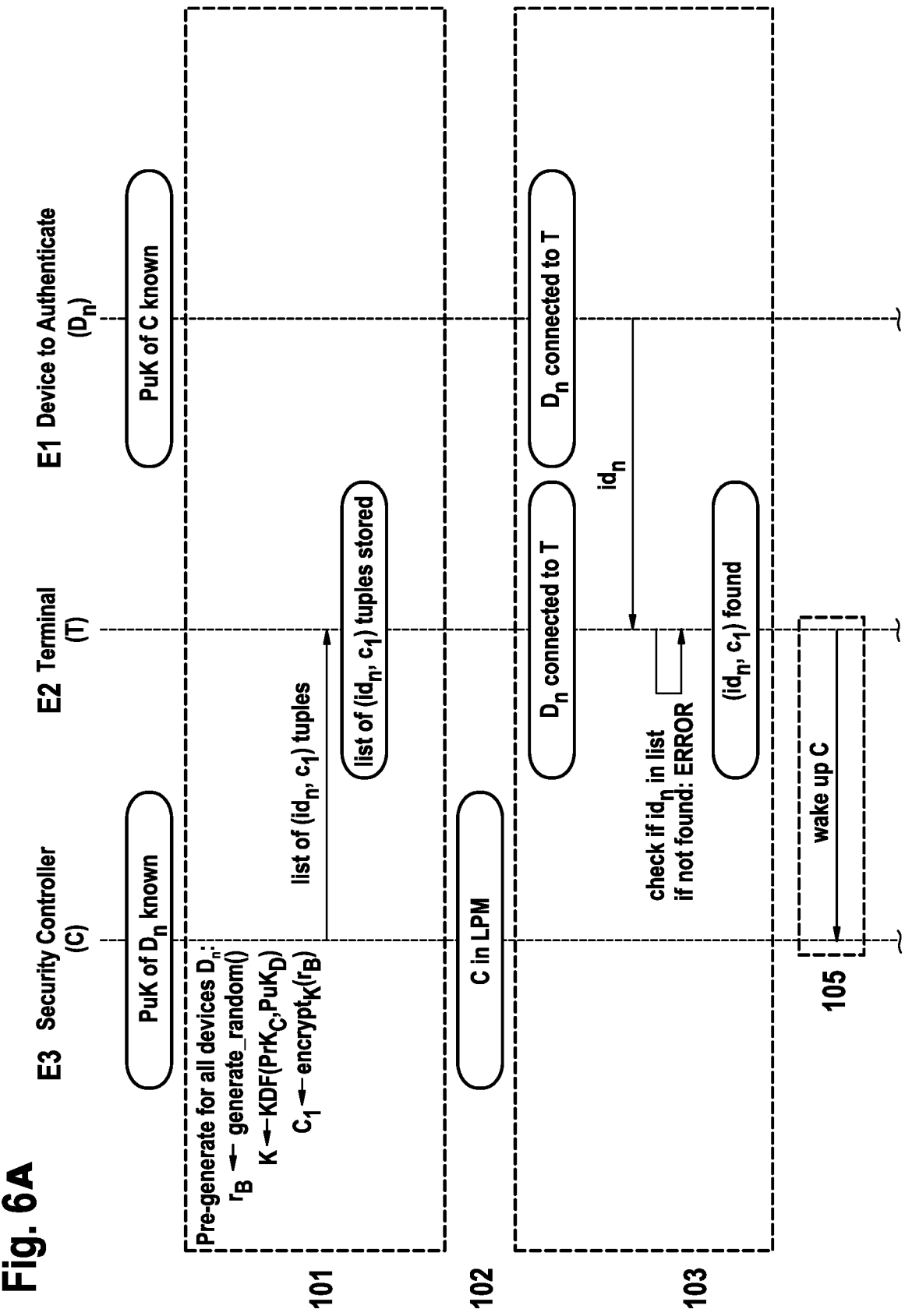
FIG. 6A-6B schematically illustrates a system performing the method shown in FIG. 2.
Figure 6B:
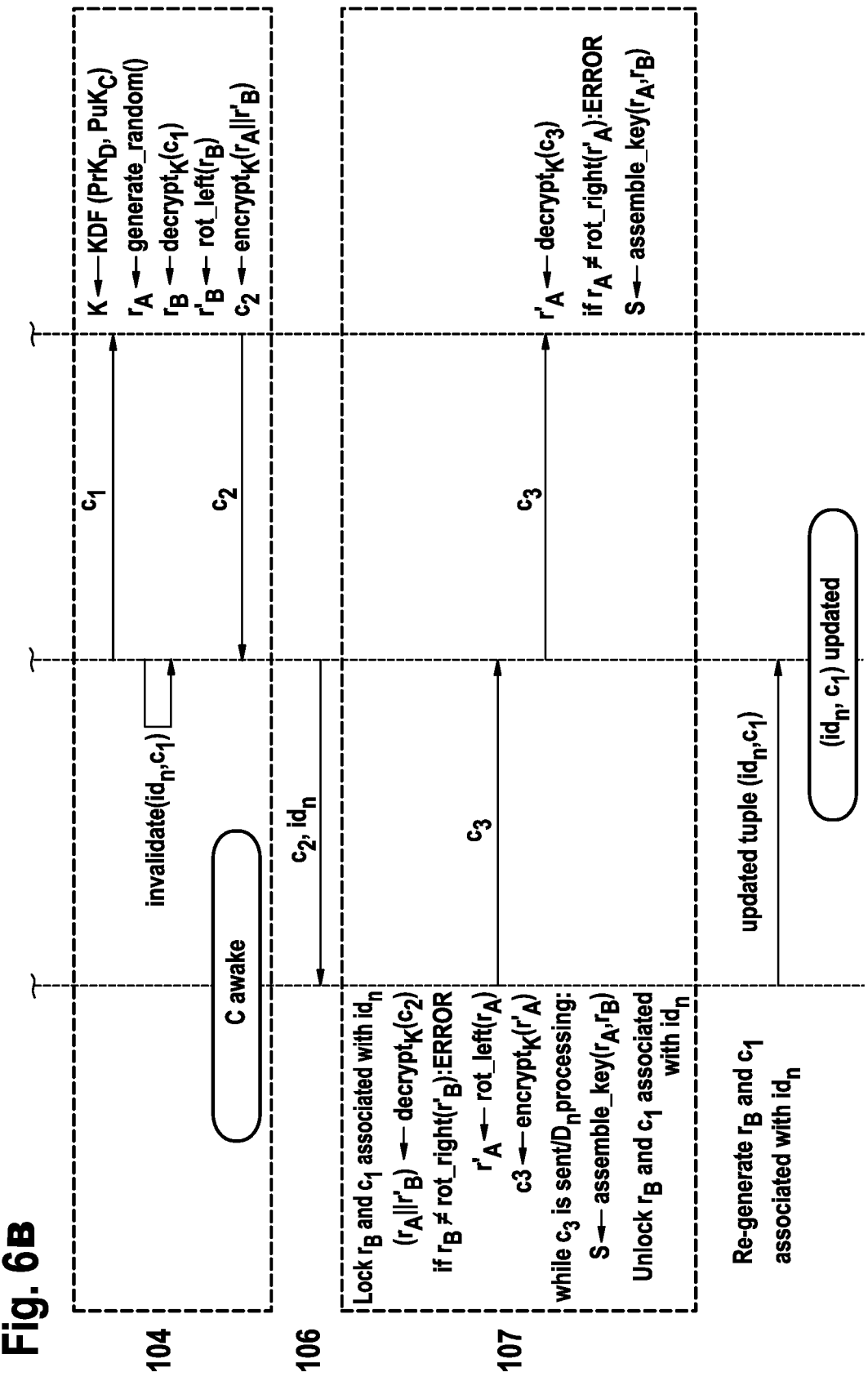

FIG. 6, which spans two pages as FIGS. 6A and 6B, schematically illustrates an alternative embodiment to the embodiment shown in FIG. 4, performing an alternative embodiment of the method shown in FIG. 2.

The only difference to FIG. 4 and thus to the method described with FIG. 2 is that the third entity E3, C in FIG. 6 automatically after unlocking the stored first random number rB and unlocking the stored first encrypted number c1 performs re-generating a new first random number, encrypting the new first random number to derive a new first encrypted number and transmitting an updated tuple to the second entity E2, T. The third entity E3, C here may not wait until it receives a request from the second entity E2, T to transmit an updated tuple comprising a new first encrypted number.

Figure 7:
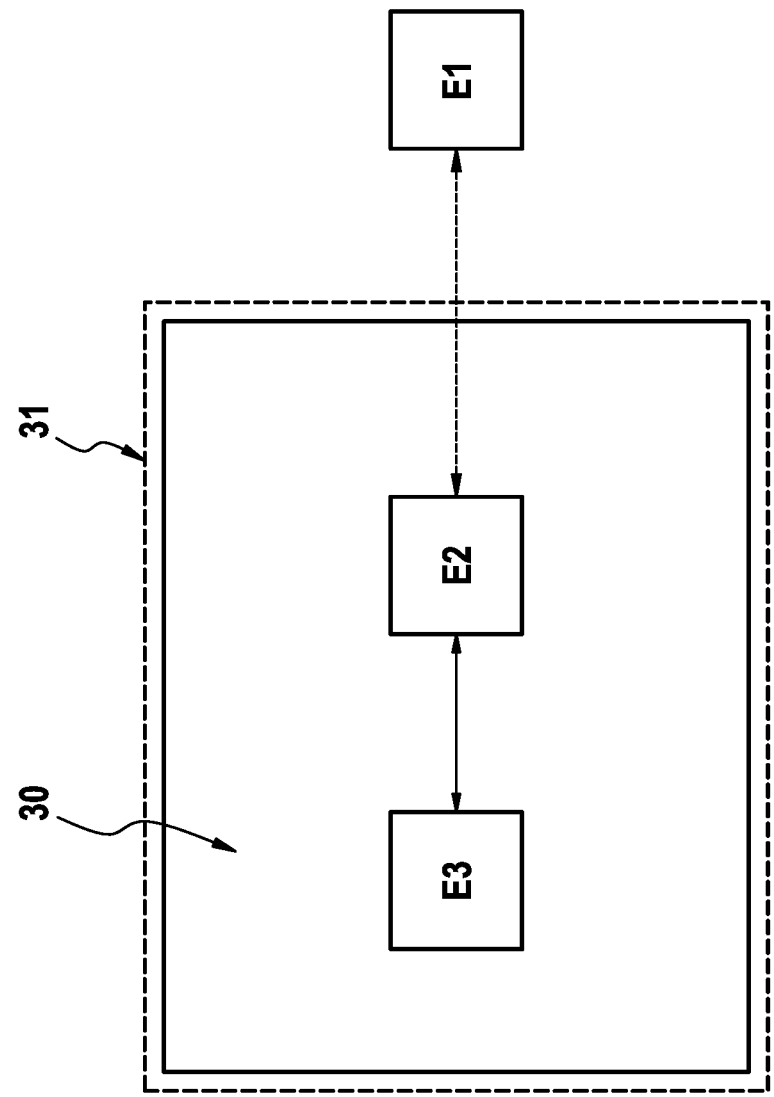
FIG. 7 schematically illustrates a system and entities according to the invention.

FIG. 7 schematically illustrates a system and entities according to the invention. The arrangement of the entities is the same as in FIG. 3 and FIG. 4, i.e. the first entity E1, that is represented by the device Dn in FIG. 3 and FIG. 4 is at the right position, the second entity E2 that is represented by the terminal T in FIG. 3 and FIG. 4 is in the middle and the third entity E3, C that is represented by the Security Controller C in FIG. 3 and FIG. 4 is arranged at the right.

The second Entity E2, T and the third Entity E3, C are introduced in an in-vehicle network 30 of a vehicle 31.

The first entity E1, Dn is a mobile phone, the second Entity E2, T is a reader in an ECU inside a door of the vehicle 31 and the third entity E3, C is a HSM inside the in-vehicle network 30. The third entity E3, C and the second Entity E2, T may communicate over a connection in the in-vehicle network 30, e.g. per wire. The first Entity E1, Dn may be used to open the door of the vehicle 31. To open the door of the vehicle 31, a mutual authentication between the first entity E1, Dn and the third entity E3, C is necessary. Therefore, the system and the entities in FIG. 1 are the same as in FIG. 3 and the system and the entities perform an authentication method as shown in FIG. 1 and FIG. 3.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An authentication method for mutual authentication between a first entity and a third entity via a second entity, based on an authentication protocol used by the first entity and the third entity, wherein the second entity forwards mutual authentication messages between the first entity and the third entity, comprising:
   a) frontloading, by the third entity, a first part of the authentication protocol to the second entity and keeping at least a missing part of the authentication protocol at the third entity, the frontloaded first part of the authentication protocol comprising a first encrypted number, the third entity, after frontloading the first part of the authentication protocol, turning from a High Power Mode into a Low Power Mode;
   b) initiating the mutual authentication;
   c) starting the mutual authentication based on the frontloaded first part of the authentication protocol, the starting comprising generating a second encrypted number by the first entity, the second encrypted number comprising content of the first encrypted number;
   d) sending, by the second entity, a wake-up signal to the third entity;
   e) rerouting, by the second entity, the mutual authentication messages, when the third entity woke up from Low Power Mode, the rerouting comprising transmitting the second encrypted number from the second entity to the third entity; and
   f) continuing, by the third entity, after rerouting the mutual authentication messages to the third entity, the mutual authentication based on the missing part of the authentication protocol, the missing part of the authentication protocol comprising instructions for the third entity to derive a session key based on the second encrypted number and instructions for the first entity to derive a session key based on a third encrypted number generated and transmitted by the third entity, the third encrypted number comprising content of the second encrypted number, and continuing comprising using the respective session keys by the first entity and the third entity to exchange authenticated messages between the first entity and the third entity.

2. The authentication method according to claim 1, wherein the rerouting starts when the third entity woke up from Low Power Mode and when the frontloaded first part of the authentication protocol between the second entity and the first entity is completed.

3. The authentication method according to claim 1, wherein the frontloading a first part of the authentication protocol comprises:
   i) pre-generating, by the third entity, the first part of the authentication protocol;
   ii) transmitting, by the third entity, the pre-generated first part of the authentication protocol from the third entity to the second entity;
   iii) receiving, by the second entity, the pre-generated first part of the authentication protocol from the third entity; and
   iv) storing, by the second entity, the received first part of the authentication protocol on the second entity.

4. The authentication method according to claim 1, wherein the frontloading comprises generating a random number and encrypting the random number with a symmetric key to derive a first encrypted number, wherein the symmetric key is derived using a one-way key derivation function based on pre-shared asymmetric key material of the first entity and the third entity.

5. The authentication method according to claim 1, wherein the frontloading comprises adding, by the third entity, an identifier to the first part of the authentication protocol.

6. The authentication method according to claim 5, wherein the identifier is a public key associated with the respective first entity and/or a serial number associated with the respective first entity.

7. The authentication method according to claim 1, wherein the sending, by the second entity, a wake-up signal to the third entity, is carried out by the second entity, by one of:
   in the initiating, immediately when the first entity operatively connects to the second entity
or
   if an identifier for identifying the first entity is added to the first part of the authentication protocol, in accordance with an identification of the first entity.

8. The authentication method according to claim 1, wherein the starting comprises, pre-generating, by the first entity, a second encrypted number and storing the second encrypted number in a secured area at the first entity.

9. A data processing system comprising a processor and memory configured to perform the authentication method for mutual authentication between a first entity and a third entity via a second entity, based on an authentication protocol used by the first entity and the third entity, wherein the second entity forwards mutual authentication messages between the first entity and the third entity, comprising:
   a) frontloading a first part of the authentication protocol to the second entity and keeping at least a missing part of the authentication protocol at the third entity, the frontloaded first part of the authentication protocol comprising a first encrypted number, the third entity, after frontloading the first part of the authentication protocol, turning from a High Power Mode into a Low Power Mode;
   b) initiating the mutual authentication;
   c) starting the mutual authentication based on the frontloaded first part of the authentication protocol, the starting comprising generating a second encrypted number by the first entity, the second encrypted number comprising content of the first encrypted number;
   d) sending, by a second entity, a wake-up signal to the third entity;
   e) rerouting, by the second entity, the mutual authentication messages, when the third entity woke up from Low Power Mode, the rerouting comprising transmitting the second encrypted number from the second entity to the third entity; and
   f) continuing, after rerouting the mutual authentication messages to the third entity, the mutual authentication based on the missing part of the authentication protocol, the missing part of the authentication protocol comprising instructions for the third entity to derive a session key based on the second encrypted number and instructions for the first entity to derive a session key based on a third encrypted number generated and transmitted by the third entity, the third encrypted number comprising content of the second encrypted number, and continuing comprising using the respective session keys by the first entity and the third entity to exchange authenticated messages between the first entity and the third entity.

10. A computer program product comprising instructions which, when the program is executed by a computer having a processor and memory, cause the computer to carry out an authentication method for mutual authentication between a first entity and a third entity via a second entity, based on an authentication protocol used by the first entity and the third entity, wherein the second entity forwards mutual authentication messages between the first entity and the third entity, comprising:
- a) frontload a first part of the authentication protocol to the second entity and keeping at least a missing part of the authentication protocol at the third entity, the frontloaded first part of the authentication protocol comprising a first encrypted number, the third entity, after frontloading the first part of the authentication protocol, turning from a High Power Mode into a Low Power Mode;
- b) initiating the mutual authentication;
- c) starting the mutual authentication based on the frontloaded first part of the authentication protocol, the starting comprising generating a second encrypted number by the first entity, the second encrypted number comprising content of the first encrypted number;
- d) sending, by a second entity, a wake-up signal to the third entity;
- e) rerouting, by the second entity, the mutual authentication messages, when the third entity woke up from Low Power Mode, the rerouting comprising transmitting the second encrypted number from the second entity to the third entity; and
- f) continuing, after rerouting the mutual authentication messages to the third entity, the mutual authentication based on the missing part of the authentication protocol, the missing part of the authentication protocol comprising instructions for the third entity to derive a session key based on the second encrypted number and instructions for the first entity to derive a session key based on a third encrypted number generated and transmitted by the third entity, the third encrypted number comprising content of the second encrypted number, and continuing comprising using the respective session keys by the first entity and the third entity to exchange authenticated messages between the first entity and the third entity.

11. A non-transitory computer-readable data storage medium comprising instructions which, when executed by a computer having a processor and memory, cause the computer to carry out an authentication method for mutual authentication between a first entity and a third entity via a second entity, based on an authentication protocol used by the first entity and the third entity, wherein the second entity forwards mutual authentication messages between the first entity and the third entity, comprising:
- a) frontloading a first part of the authentication protocol to the second entity and keeping at least a missing part of the authentication protocol at the third entity, the frontloaded first part of the authentication protocol comprising a first encrypted number, the third entity, after frontloading the first part of the authentication protocol, turning from a High Power Mode into a Low Power Mode;
- b) initiating the mutual authentication;
- c) starting the mutual authentication based on the frontloaded first part of the authentication protocol, the starting comprising generating a second encrypted number by the first entity, the second encrypted number comprising content of the first encrypted number;
- d) sending, by a second entity, a wake-up signal to the third entity;
- e) rerouting, by the second entity, the mutual authentication messages, when the third entity woke up from Low Power Mode, the rerouting comprising transmitting the second encrypted number from the second entity to the third entity; and
- f) continuing, after rerouting the mutual authentication messages to the third entity, the mutual authentication based on the missing part of the authentication protocol, the missing part of the authentication protocol comprising instructions for the third entity to derive a session key based on the second encrypted number and instructions for the first entity to derive a session key based on a third encrypted number generated and transmitted by the third entity, the third encrypted number comprising content of the second encrypted number, and continuing comprising using the respective session keys by the first entity and the third entity to exchange authenticated messages between the first entity and the third entity.

* * * * *